(12) United States Patent
Chu et al.

(10) Patent No.: US 11,175,752 B1
(45) Date of Patent: Nov. 16, 2021

(54) ROLLER MOUSE OPERABLE IN TWO CLICKING MODES

(71) Applicant: Primax Electronics Ltd., Taipei (TW)

(72) Inventors: Chun-Lin Chu, Taipei (TW); Hsiang-Yu Ou, Taipei (TW); Li-Kuei Cheng, Taipei (TW); Shu-An Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/031,757

(22) Filed: Sep. 24, 2020

(30) Foreign Application Priority Data

Jul. 10, 2020 (TW) .................................. 109123446

(51) Int. Cl.
*G06F 3/0354* (2013.01)
*G06F 3/038* (2013.01)

(52) U.S. Cl.
CPC ........ *G06F 3/03543* (2013.01); *G06F 3/0383* (2013.01)

(58) Field of Classification Search
CPC ............................ G06F 3/0362; G06F 3/03543
See application file for complete search history.

(56) References Cited

U.S. PATENT DOCUMENTS

| | | | | |
|---|---|---|---|---|
| 7,733,328 B2* | 6/2010 | Blandin | ................ | G06F 3/0362 345/163 |
| 10,444,872 B2* | 10/2019 | Hsueh | ................... | G06F 3/0362 |
| 10,599,238 B1* | 3/2020 | Wu | ....................... | G06F 3/0362 |
| 2006/0001657 A1* | 1/2006 | Monney | ................ | G06F 3/0312 345/184 |
| 2007/0146324 A1* | 6/2007 | Blandin | .............. | G06F 3/03543 345/163 |
| 2007/0146424 A1* | 6/2007 | Umeda | ................ | B41J 2/16535 347/38 |
| 2007/0188453 A1* | 8/2007 | O'Sullivan | ........... | G06F 3/0312 345/163 |
| 2010/0141583 A1* | 6/2010 | Wu | ....................... | G06F 3/0312 345/164 |
| 2010/0238113 A1* | 9/2010 | Wu | ....................... | G06F 3/0362 345/163 |
| 2011/0298713 A1* | 12/2011 | Wu | ..................... | G06F 3/03543 345/163 |
| 2013/0027308 A1* | 1/2013 | Peng | .................. | G06F 3/03543 345/163 |
| 2013/0215031 A1* | 8/2013 | Peng | .................... | G06F 3/0362 345/163 |
| 2013/0321272 A1* | 12/2013 | Deng | .................... | G06F 3/0362 345/163 |

(Continued)

*Primary Examiner* — Chun-Nan Lin
(74) *Attorney, Agent, or Firm* — Kirton McConkie; Evan R. Witt

(57) ABSTRACT

A roller mouse includes a casing, a wheel module, a swingable assembly and an adjusting element. The wheel module includes a wheel element. The swingable assembly is fixed on the wheel module, and located near the wheel element. When the adjusting element is in a first position, the swingable assembly is contacted with the wheel element, so that the wheel module is in a first clicking mode. When the adjusting element is moved to a second position, the swingable assembly is pushed by the adjusting element, and the swingable assembly is separated from the wheel element, so that the wheel module is in a second clicking mode.

11 Claims, 8 Drawing Sheets

(56) References Cited

U.S. PATENT DOCUMENTS

| | | | | |
|---|---|---|---|---|
| 2018/0329525 A1* | 11/2018 | Chang | ................ | G06F 3/03543 |
| 2019/0073048 A1* | 3/2019 | Tsai | .................... | G06F 3/03543 |
| 2019/0094991 A1* | 3/2019 | Tsai | ..................... | G06F 3/0362 |
| 2019/0094994 A1* | 3/2019 | Tsai | ..................... | G06F 3/0362 |

\* cited by examiner

ROLLER MOUSE OPERABLE IN TWO CLICKING MODES

FIELD OF THE INVENTION

The present invention relates to a roller mouse, and more particularly to a roller mouse that is operable in one of plural different clicking modes.

BACKGROUND OF THE INVENTION

Computer systems are important tools for modern people. For example, the computer system can be used in a word processing application, a video playback application, a drawing application, a programming application, and so on. Generally, the computer system is connected with a mouse and a keyboard. The user may operate the mouse and the keyboard to control the computer system. When a roller mouse is held on the palm of a user, the user may move the mouse to control movement of the cursor shown on the computer screen. Since the mouse devices can comply with the usual practices of most users, mice are the most prevailing among these peripheral input devices.

The structure of the roller mouse will be described as follows. FIG. 1 is a schematic perspective view illustrating the appearance of a conventional roller mouse. The conventional roller mouse is disclosed in U.S. Pat. No. 7,733,328 for example. As shown in FIG. 1, the roller mouse 10 comprises a casing 101, a wheel module 105, two control buttons 110, a detector (not shown) and an encoder (not shown). The detector and the encoder are used for detecting the movement of the casing 101 relative to a working surface. For example, the working surface is a desk surface for placing the roller mouse thereon). According to the movement of the casing 101, a corresponding signal is transmitted to the computer system to control the moving trajectory of the mouse cursor.

The structure of the wheel module 105 will be described as follows. FIG. 2 is a schematic perspective view illustrating the structure of the wheel module of the conventional roller mouse. The wheel module 105 comprises a wheel element 106, a bracket 107, a pivotal arm 108 and a driving motor 104. The wheel element 106 is disposed within the bracket 107. By rotating the wheel element 106 for a specified rotation amount, the computer system executes a specified control command according to the rotation amount. When the specified control command is executed, a specified function (e.g. the function of scrolling the image frame shown on the computer, the function of zooming in/out the picture or the function adjusting the sound volume) is implemented.

In addition, the inner portion of the wheel element 106 has a corrugated surface 1061. In a case that the pivotal arm 108 is driven by the driving motor 104 and contacted with the corrugated surface 1061, the user may sense plural times of clicking feels whenever the wheel element 106 is rotated for one turn. The clicking feels can provide the function like graduations. Consequently, when the specified control command is executed, the corresponding execution level is provided according to the clicking feel. For example, whenever one clicking feel is generated in response to the rotation of the wheel element 106, the computer system controls the graphic-based window of the computer screen to scroll three lines.

Whereas, in case that the pivotal arm 108 is driven by the driving motor 104 and separated from the corrugated surface 1061, the wheel element 106 is continuously rotated for a certain time period because the pivotal arm 108 is separated from the corrugated surface 1061. In other words, the rotation of the wheel element 106 is not influenced by the pivotal arm 108. Under this circumstance, the wheel element 300 is rotated in a smooth stepless manner without resulting in a clicking feel. Consequently, when the specified control command is executed, the maximum execution level is provided. For example, when the user intends to scroll the graphic-based window of the computer screen from the uppermost position to the lowermost position, the user may only rotate the wheel element 106 for one time without the need of repeatedly rotating the wheel element 106. Until the graphic-based window shown on the computer screen is scrolled to a desired position, the rotation of the wheel element 106 is stopped.

FIG. 3 is a schematic exploded view illustrating the structure of the wheel module of the conventional roller mouse. In FIG. 3, a triggering switch 109 is shown. The triggering switch 109 is located under the bracket 107. While the wheel element 106 is pressed down by the user, the bracket 107 is correspondingly moved downwardly with the wheel element 106 along a vertical direction D. Consequently, the triggering switch 109 is pushed by the bracket 107. Since the triggering switch 109 is triggered, the driving motor 104 is enabled to drive the pivotal arm 108. In such way, the pivotal arm 108 is contacted with the corrugated surface 1061, or the pivotal arm 108 is not contacted with the corrugated surface 1061.

As mentioned above, the conventional roller mouse 10 is selectively operated in one of two clicking modes according to the result of judging whether the pivotal arm 108 is contacted with the corrugated surface 1061. By pressing down the wheel element 106, the clicking mode is switched. The roller mouse operable in two clicking modes has been introduced into the market for many years. However, it is important to provide a better method of switching the clicking mode and reduce the cost of the roller mouse.

SUMMARY OF THE INVENTION

An object of the present invention provides a roller mouse that is operable in two clicking modes and is cost-effective.

In accordance with an aspect of the present invention, a roller mouse is provided. The roller mouse includes a casing, a wheel module, a swingable assembly and an adjusting element. The wheel module is disposed within the casing. The wheel module includes a wheel element. The wheel element is rotatable. The wheel element includes a wheel body, a rotation shaft and a fence structure. The wheel body is partially exposed outside the casing. The rotation shaft is disposed within the wheel body. The fence structure is arranged between the wheel body and the rotation shaft. The swingable assembly is fixed on the wheel module and located near the wheel element. The swingable assembly is swung relative to the wheel module in a direction toward the wheel element to be contacted with the fence structure, or the swingable assembly is swung relative to the wheel module in a direction away from the wheel element to be separated from the fence structure. The adjusting element is partially exposed outside the casing. As the adjusting element is moved relative to the casing, the swingable assembly is correspondingly swung. When the adjusting element is moved to a first position, the swingable assembly is not pushed by the adjusting element, and the swingable assembly is contacted with the fence structure. Consequently, the wheel module is in a first clicking mode. When the adjusting element is moved to a second position, the swingable assembly is pushed by the adjusting element, and the swingable assembly is swung away from the wheel element and separated from the fence structure. Consequently, the wheel module is in a second clicking mode.

In accordance with another aspect of the present invention, a roller mouse is provided. The roller mouse includes a casing, a swingable assembly and a switching module. The switching module includes a power element and a cam structure. The wheel module is disposed within the casing. The wheel module includes a wheel element. The wheel element is rotatable. The wheel element includes a wheel body, a rotation shaft and a fence structure. The wheel body is partially exposed outside the casing. The rotation shaft is disposed within the wheel body. The fence structure is arranged between the wheel body and the rotation shaft. The swingable assembly is fixed on the wheel module, and located near the wheel element. The swingable assembly is swung relative to the wheel module in a direction toward the wheel element to be contacted with the fence structure, or the swingable assembly is swung relative to the wheel module in a direction away from the wheel element to be separated from the fence structure. The switching module is disposed within the casing. When the switching module is driven, the swingable assembly is correspondingly swung. When the cam structure is rotated to a first angle, the swingable assembly is not pushed by the cam structure, and the swingable assembly is contacted with the fence structure, so that the wheel module is in a first clicking mode. When the cam structure is rotated to a second angle, the swingable assembly is pushed by the cam structure, and the swingable assembly is separated from the fence structure, so that the wheel module is in a second clicking mode.

From the above descriptions, the present invention provides the roller mouse. The roller mouse is selectively operated in one of plural clicking modes through the adjustment of a simple mechanism. That is, the clicking mode is switched through the simple linking relationship between the swingable assembly and the adjusting element (or the switching module). Due to the simple mechanism, the clicking mode is switched in a stable manner, and the cost of the roller mouse is reduced. Consequently, the drawbacks of the conventional technologies can be overcome.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
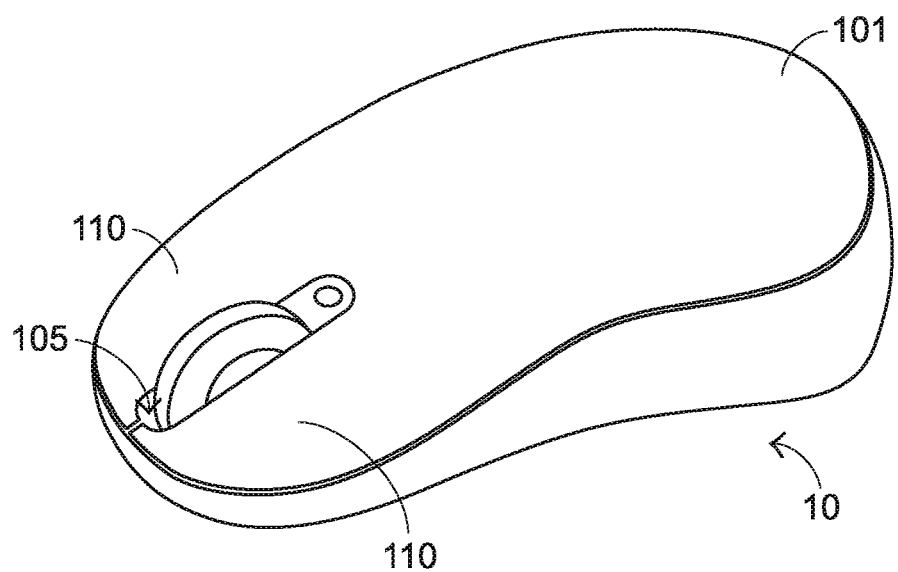
FIG. 1 is a schematic perspective view illustrating the appearance of a conventional roller mouse.
Figure 2:
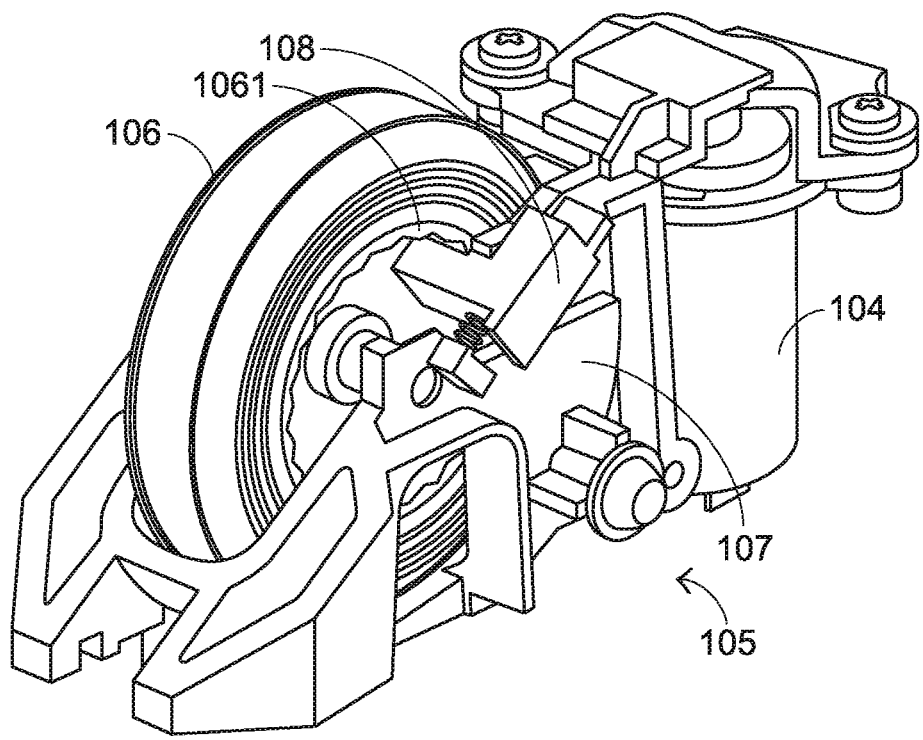
FIG. 2 is a schematic perspective view illustrating the structure of the wheel module of the conventional roller mouse.
Figure 3:
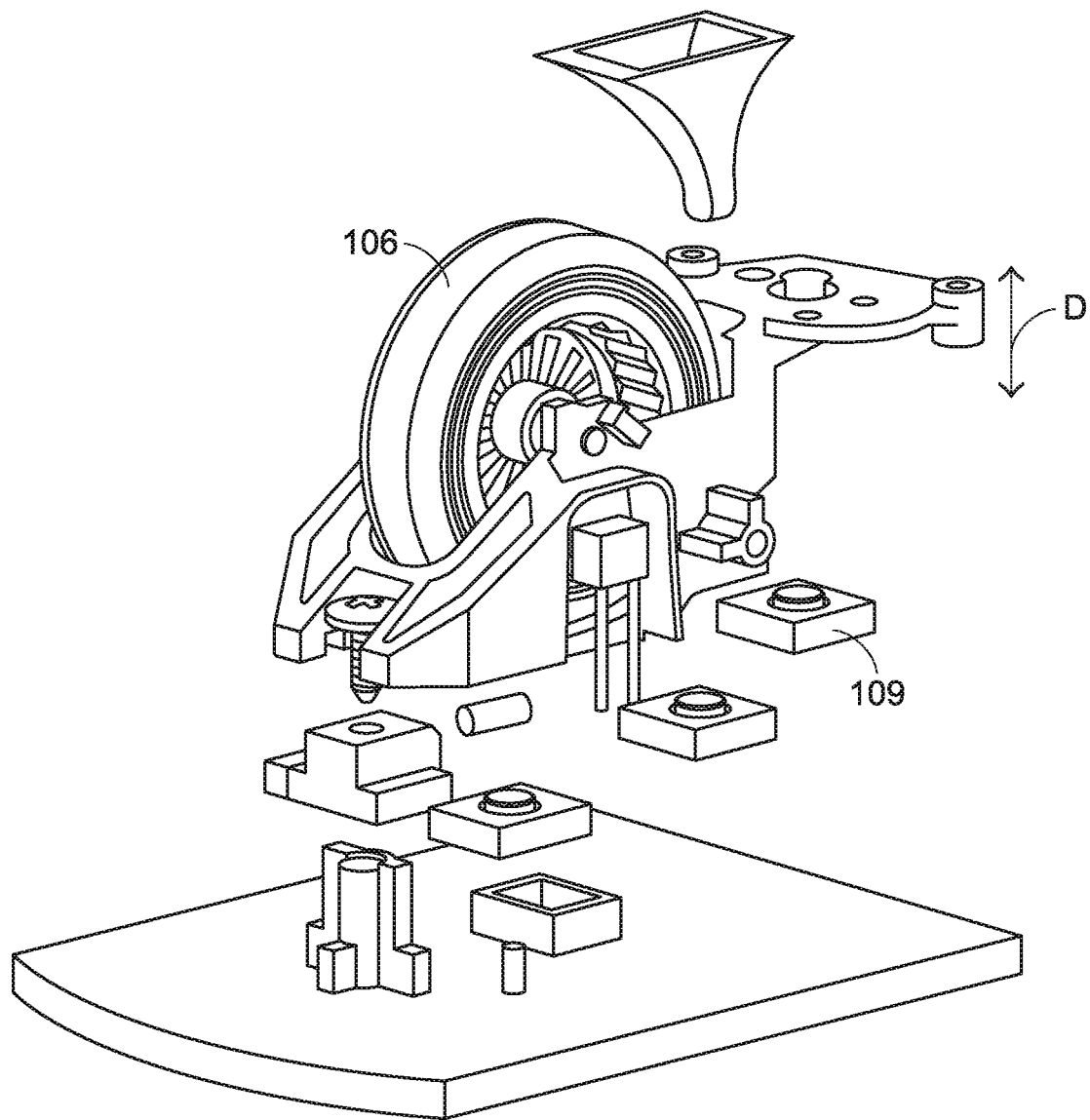
FIG. 3 is a schematic exploded view illustrating the structure of the wheel module of the conventional roller mouse.

The present invention provides a roller mouse in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 4:
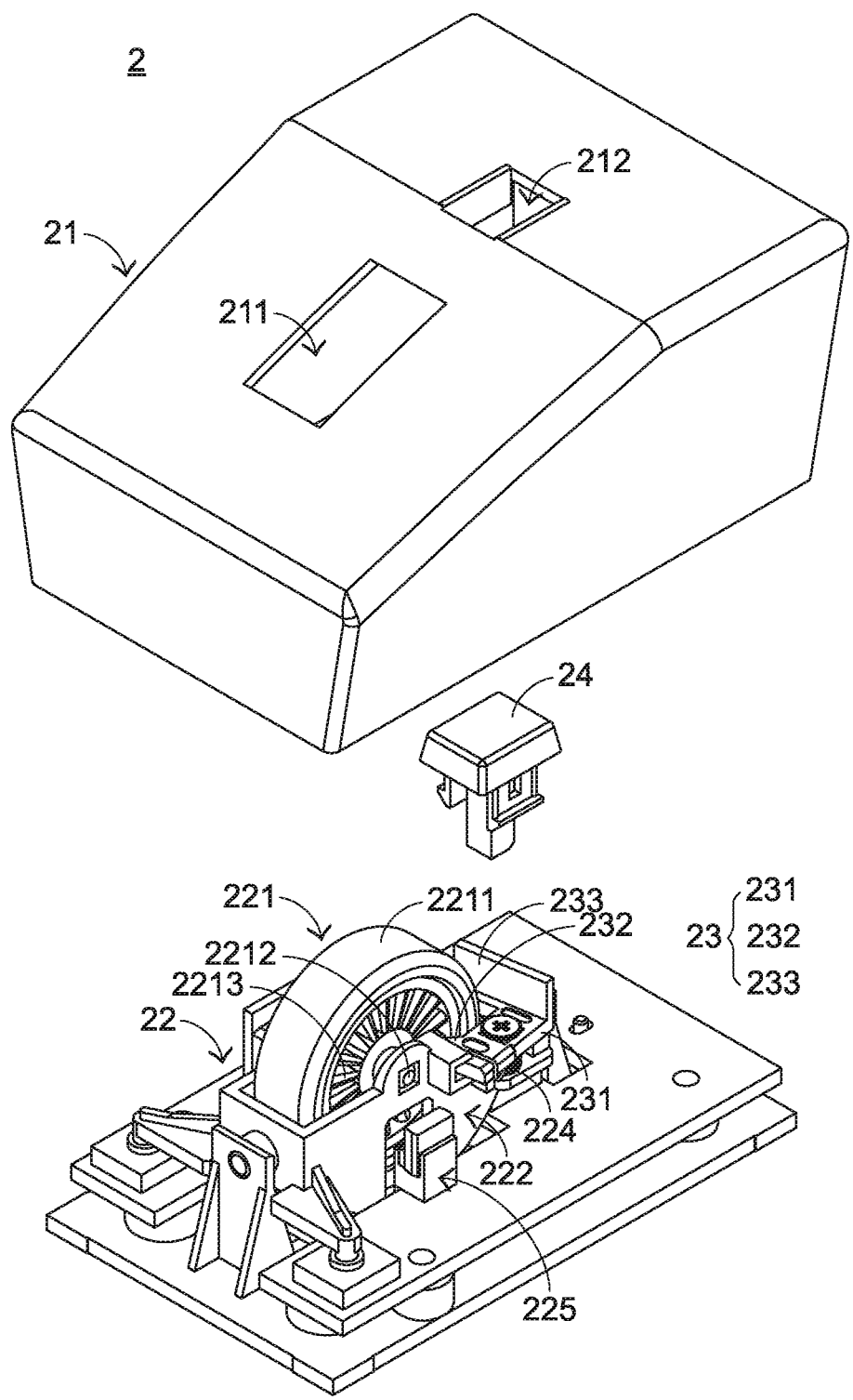
FIG. 4 is a schematic exploded view illustrating a portion of a roller mouse according to a first embodiment of the present invention.
Figure 5:
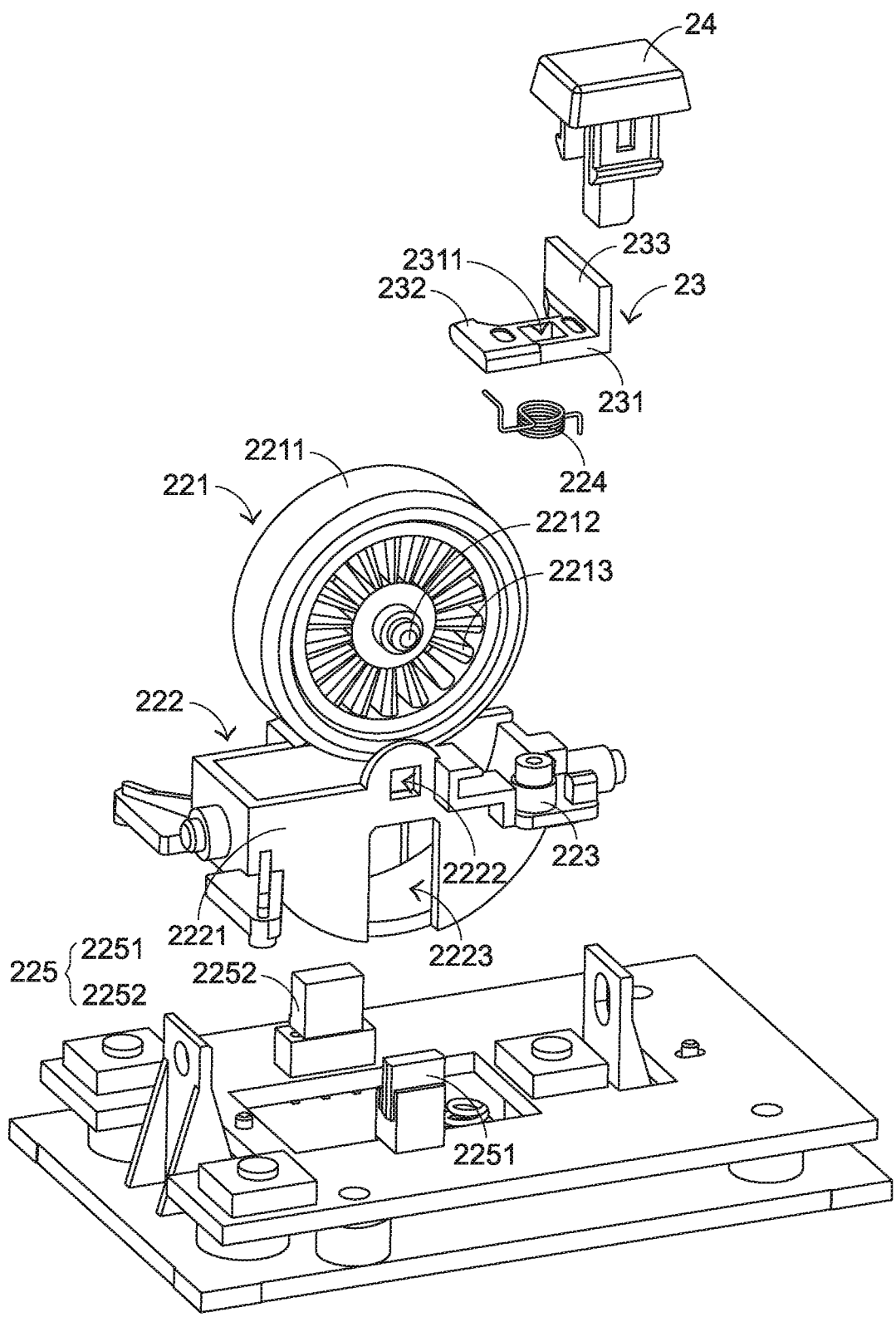
FIG. 5 is a schematic exploded view illustrating another portion of the roller mouse according to the first embodiment of the present invention.

Please refer to FIGS. 4 and 5. FIG. 4 is a schematic exploded view illustrating a portion of a roller mouse according to a first embodiment of the present invention. FIG. 5 is a schematic exploded view illustrating another portion of the roller mouse according to the first embodiment of the present invention. The roller mouse 2 comprises a casing 21, a wheel module 22, a swingable assembly 23 and an adjusting element 24. The casing 21 comprises a first opening 211 and a second opening 212. The first opening 211 is aligned with the wheel module 22. The second opening 212 is aligned with the adjusting element 24.

The wheel module 22 comprises a wheel element 221, a wheel swinging seat 222, a fixing post 223, an elastic element 224 and a signal generation module 225. The wheel element 221 comprises a wheel body 2211, a rotation shaft 2212 and a fence structure 2213.

The wheel module 22 is disposed within the casing 21. A portion of the wheel element 221 of the wheel module 22 is penetrated through the first opening 211 and exposed outside the casing 21. Consequently, the wheel element 221 is rotatable by the user.

In the wheel element 221, the wheel body 2211 is penetrated through the first opening 211 and partially exposed outside the casing 21. The rotation shaft 2212 is disposed within the wheel body 2211. The fence structure 2213 is arranged between the wheel body 2211 and the rotation shaft 2212. Preferably but not exclusively, the rotation shaft 2212 and the fence structure 2213 are integrally formed with the wheel body 2211.

Please refer to FIGS. 4 and 5 again. The swingable assembly 23 is fixed on the wheel module 22 and located near the wheel element 221. The swingable assembly 23 can be swung relative to the wheel module 22. Consequently, the swingable assembly 23 is swung in the direction toward the wheel element 221 and contacted with the fence structure 2213, or the swingable assembly 23 is swung in the direction away from the wheel element 221 and not contacted with the fence structure 2213.

The adjusting element 24 is penetrated through the second opening 212 of the casing 21 and partially exposed outside the casing 21. As the adjusting element 24 is moved relative to the casing 21, the swingable assembly 23 is correspondingly swung. When the adjusting element 24 is in a first position P1, the swingable assembly 23 is not pushed by the adjusting element 24, and the swingable assembly 23 is contacted with the fence structure 2213. Consequently, the wheel module 22 is in a first clicking mode. When the adjusting element 24 is moved to a second position P2, the swingable assembly 23 is pushed by the adjusting element 24. At the same time, the swingable assembly 23 is swung in the direction away from the wheel element 221 and separated from the fence structure 2213. Consequently, the wheel module 22 is in a second clicking mode.

Figure 6:
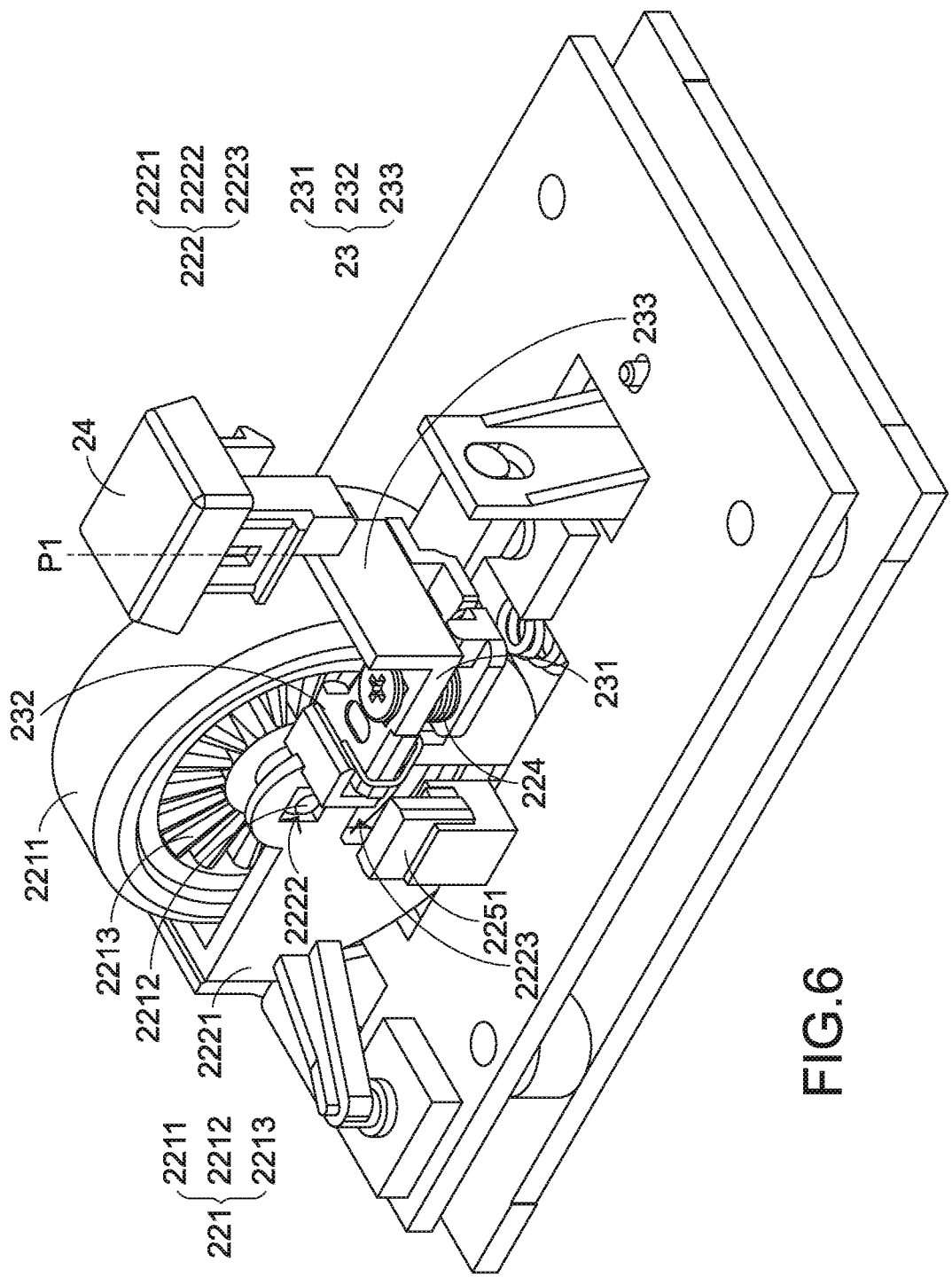
FIG. 6 is a schematic perspective view illustrating a portion of the roller mouse according to the first embodiment of the present invention, in which the wheel module is in a first clicking mode.

The structures of other components of the wheel module 22 will be described as follows. Please refer to FIGS. 4, 5 and 6. FIG. 6 is a schematic perspective view illustrating a portion of the roller mouse according to the first embodiment of the present invention, in which the wheel module is in a first clicking mode. The wheel swinging seat 222 of the wheel module 22 is disposed within the casing 21 and swingable relative to the casing 21. The wheel element 221 is accommodated within the wheel swinging seat 222. The wheel element 221 is rotatably penetrated through plural first holes 2222 of the wheel swinging seat 222. Consequently, the wheel element 221 is fixed on the wheel swinging seat 222. In an embodiment, the wheel swinging seat 222 comprises a seat body 2221, the plural first holes 2222 and plural second holes 2223. The plural first holes 2222 are formed in the seat body 2221. The rotation shaft 2212 is penetrated through plural first holes 2222, and thus the wheel element 221 is fixed in the seat body 2221. The plural second holes 2223 are formed in plural lateral surfaces of the seat body 2221. Moreover, the plural second holes 2223 are aligned with the signal generation module 225. Consequently, the signal generation module 225 can detect the rotation of the wheel element 221 through the plural second holes 2223.

The fixing post 223 is installed on the seat body 2221 of the wheel swinging seat 222. The fixing post 223 is penetrated through the swingable assembly 23, and thus the swingable assembly 23 is fixed on the wheel swinging seat 222. The elastic element 224 is sheathed around the fixing post 223 and contacted with the swingable assembly 23. When the swingable assembly 23 is not pushed by the adjusting element 24, the swingable assembly 23 is contacted with the fence structure 2213 in response to the elastic force of the elastic element 224. The signal generation module 225 is located beside the wheel swinging seat 222. According to the rotation of the wheel element 221, the signal generation module 225 generates a corresponding rotation signal. In an embodiment, the elastic element 224 is a torsion spring. Moreover, the signal generation module 225 comprises a light emitter 2251 and a light receiver 2252. The light emitter 2251 is located beside a first side of the wheel swinging seat 222. The light emitter 2251 emits a light beam. The light receiver 2252 is located beside a second side of the wheel swinging seat 222. When the light beam from the light emitter 2251 is transmitted through the fence structure 2213 and received by the light receiver 2252, the light receiver 2252 generates a corresponding rotation signal.

Hereinafter, the detailed structure of the swingable assembly 23 will be described with reference to FIGS. 5 and 6. The swingable assembly 23 comprises a main body 231, a first contact part 232 and a second contact part 233. The main body 231 has a fixing hole 2311. The fixing post 223 is penetrated through the fixing hole 2311. Consequently, the main body 231 is fixed on the fixing post 223. The first contact part 232 is located at a first end of the main body 231 and located near the wheel element 221. When the swingable assembly 23 is close to the wheel element 221, the first contact part 232 is contacted with the fence structure 2213. The second contact part 233 is located at a second end of the main body 231. As the second contact part 233 is pushed by the adjusting element 24, the swingable assembly 23 is swung relative to the wheel swinging seat 222. In an embodiment, the first contact part 232 and the second contact part 233 are integrally formed with the main body 231. It is noted that numerous modifications and alterations may be made while retaining the teachings of the invention. For example, in another embodiment, the first contact part and the second contact part are fixed on the main body 231 in any appropriate fixing means.

Figure 7:
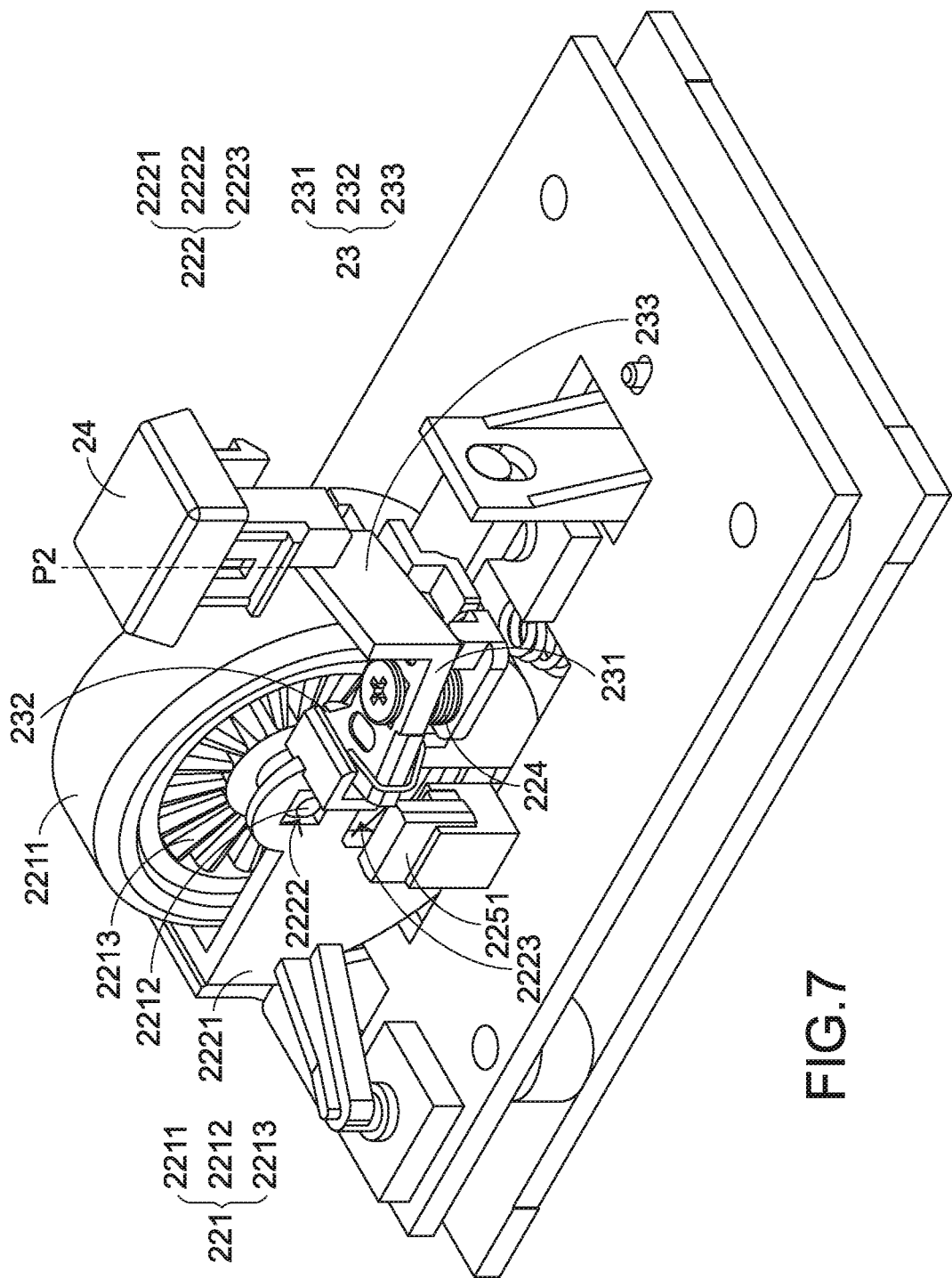
FIG. 7 is a schematic perspective view illustrating a portion of the roller mouse according to the first embodiment of the present invention, in which the wheel module is in a second clicking mode.

Hereinafter, the operations of the roller mouse 2 will be described with reference to FIGS. 6 and 7. FIG. 7 is a schematic perspective view illustrating a portion of the roller mouse according to the first embodiment of the present invention, in which the wheel module is in a second clicking mode. In case that the user intends to sense the clicking feel, the user may move the adjusting element 24 to a first position P1, and the second contact part 233 of the swingable assembly 23 is not pushed by the adjusting element 24. Meanwhile, the first contact part 232 of the swingable assembly 23 is contacted with the fence structure 2213 in response to the elastic force of the elastic element 224. Under this circumstance, the wheel module 22 is in a first clicking mode (see FIG. 6). As mentioned above, the swingable assembly 23 is contacted with the fence structure 2213 in the first clicking mode. Consequently, when the wheel element 221 is rotated, the user can sense the clicking feel from the collision between the swingable assembly 23 and the fence structure 2213.

In case that the user does not intend to sense the clicking feel, the user may move the adjusting element 24 to a second position P2. While the adjusting element 24 is moved to the second position P2, the swingable assembly 23 is swung in the direction away from the fence structure 2213. Consequently, the second contact part 233 of the swingable assembly 23 is moved in the direction away from the wheel element 221 and not contacted with the fence structure 2213. Under this circumstance, the wheel module 22 is in a second clicking mode (see FIG. 7). In the second clicking mode, the wheel element 221 is rotated in a smooth stepless manner without resulting in a clicking feel.

Figure 8:
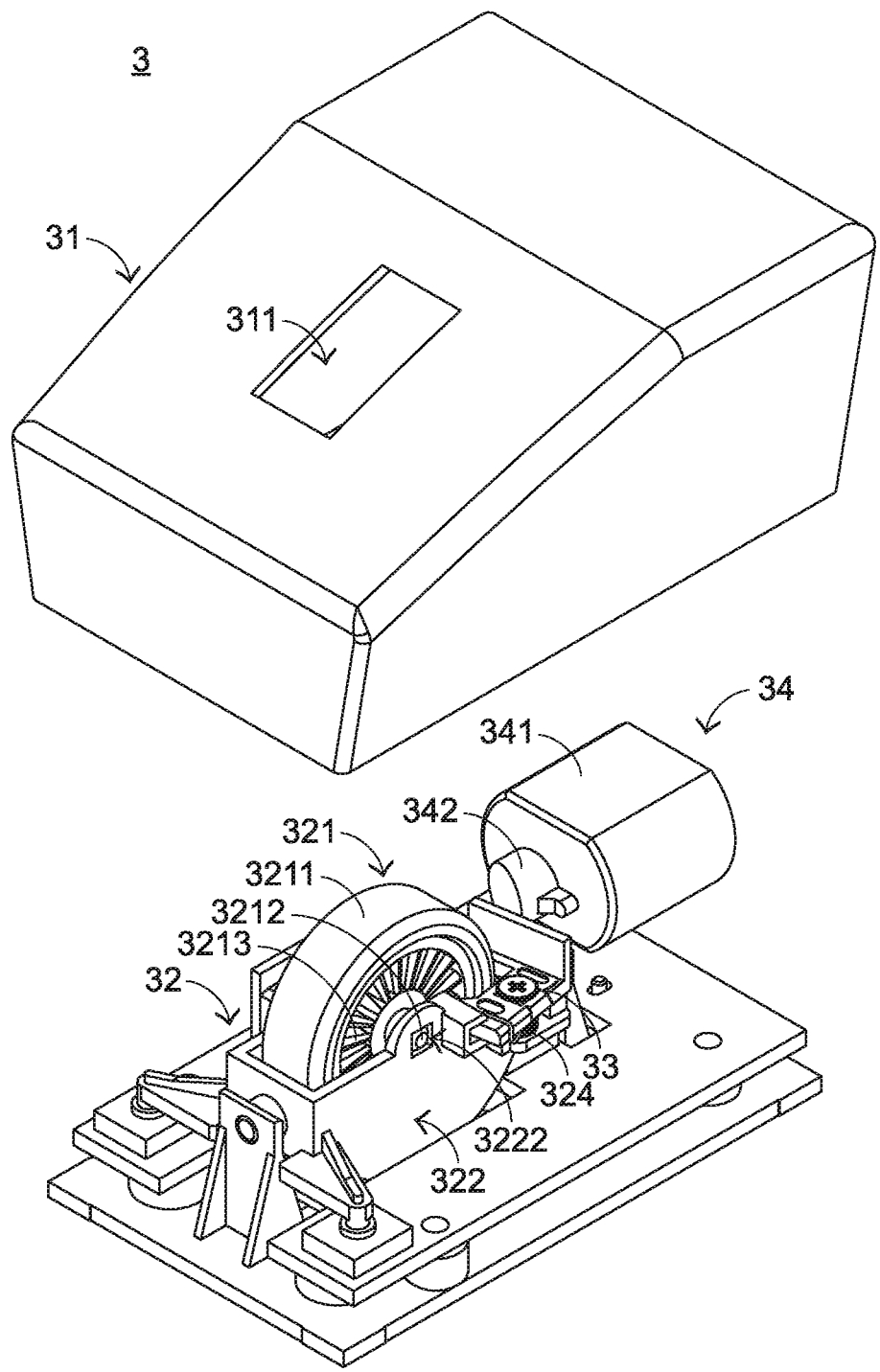
FIG. 8 is a schematic exploded view illustrating a portion of a roller mouse according to a second embodiment of the present invention.
Figure 9:
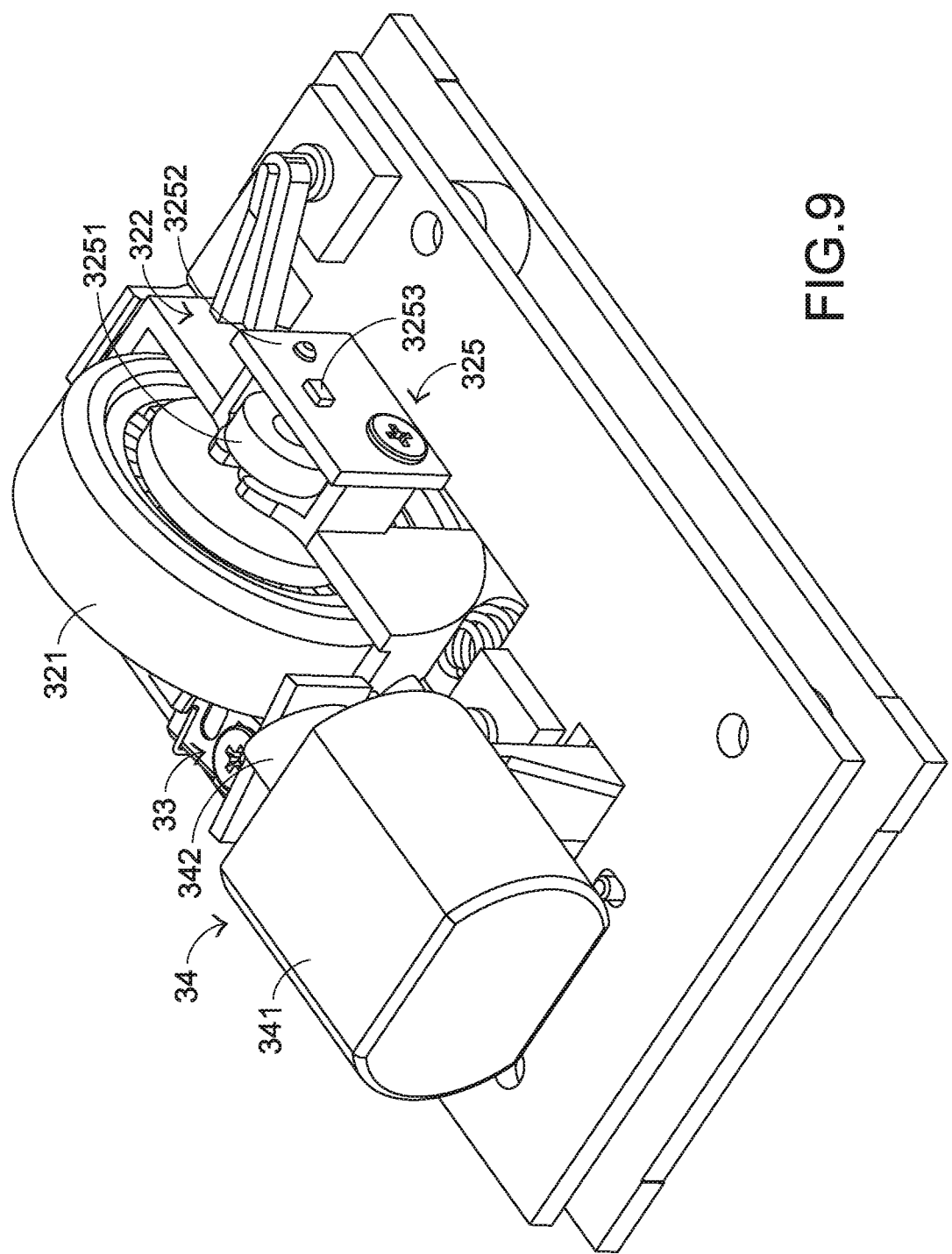
FIG. 9 is a schematic perspective view illustrating a portion of the roller mouse according to the second embodiment of the present invention.

The present invention further provides a second embodiment of a roller mouse in order to provide other functions. Please refer to FIGS. 8 and 9. FIG. 8 is a schematic exploded view illustrating a portion of a roller mouse according to a second embodiment of the present invention. FIG. 9 is a schematic perspective view illustrating a portion of the roller mouse according to the second embodiment of the present invention. In this embodiment, the roller mouse 3 comprises a casing 31, a wheel module 32, a swingable assembly 33 and a switching module 34. The wheel module 32 comprises a wheel element 321, a wheel swinging seat 322, a fixing post (not shown), an elastic element 324 and a signal generation module 325. The wheel element 321 comprises a wheel body 3211, a rotation shaft 3212 and a fence structure 3213. Except for the following two aspects, the structure and operation of the roller mouse of this embodiment are similar to those of the first embodiment. Firstly, the roller mouse 3 of this embodiment is equipped with the switching module 34 for swinging the swingable assembly 33. Secondly, the structure of the signal generation module 325 for generating the rotation signal is distinguished.

The structure of the switching module 34 will be described as follows. The switching module 34 is disposed within the casing 31 and contacted with the swingable assembly 33. When the switching module 34 is electrically driven by a battery for example, the swingable assembly 33 is correspondingly swung. When the switching module 34 is not driven, the swingable assembly 33 is contacted with the fence structure 3213. Under this circumstance, the wheel module 32 is in a first clicking mode. When the switching module 34 is driven and the swingable assembly 33 is pushed by the switching module 34, the swingable assembly 33 is swung in the direction away from the wheel element 321 and separated from the fence structure 3213. Under this circumstance, the wheel module 32 is in a second clicking mode.

As shown in FIG. 8, the switching module 34 comprises a power element 341 and a cam structure 342. The power element 341 is disposed within the casing 31. When the power element 341 is electrically driven, the power element 341 provides a rotation force. The cam structure 342 is connected with the power element 341 and contacted with the swingable assembly 33. In response to the rotation force, the swingable assembly 33 is correspondingly rotated. When the cam structure 342 is rotated to a first angle, the swingable assembly 33 is not pushed by the cam structure 342. Meanwhile, the swingable assembly 33 is contacted with the fence structure 3213 in response to the elastic force of the elastic element 324. Under this circumstance, the wheel module 32 is in the first clicking mode. When the cam structure 342 is rotated to a second angle, the swingable assembly 33 is pushed by the cam structure 342. Moreover, the swingable assembly 33 is swung in the direction away from the fence structure 3213 and separated from the fence structure 3213. Under this circumstance, the wheel module 32 is in the second clicking mode.

Hereinafter, the structure of the signal generation module 325 will be described with reference to FIGS. 8 and 9. The signal generation module 325 comprises a magnetic element 3251, a circuit board 3252 and a Hall sensor 3253. The magnetic element 3251 is installed on the rotation shaft 3212 and synchronously rotated with the rotation shaft 3212. The circuit board 3252 is installed on a lateral surface of the wheel swinging seat 322. The Hall sensor 3253 is installed on the circuit board 3252 and located near the magnetic element 3251. By detecting the change of the magnetic field of the magnetic element 3251, the Hall sensor 3253 generates a corresponding rotation signal.

The following two aspects should be specially described. Firstly, the casing 31 has a single opening 311 corresponding to the wheel module 32 because the switching module 34 is disposed within the casing 31. That is, the second opening 212 in the above embodiment is omitted. Secondly, the signal generation module of this embodiment is distinguished from that of the first embodiment. Consequently, the wheel swinging seat 322 of this embodiment comprises plural holes 3222 corresponding to the rotation shaft 3212. That is, the wheel swinging seat 322 is not equipped with the plural second holes 2223 of the first embodiment.

From the above descriptions, the present invention provides the roller mouse. The roller mouse is selectively operated in one of plural clicking modes through the adjustment of a simple mechanism. That is, the clicking mode is switched through the simple linking relationship between the swingable assembly and the adjusting element (or the switching module). Due to the simple mechanism, the clicking mode is switched in a stable manner, and the cost of the roller mouse is reduced. Consequently, the drawbacks of the conventional technologies can be overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A roller mouse, comprising:
   a casing;
   a wheel module disposed within the casing comprising:
      a rotatable wheel element comprising a wheel body, a rotation shaft, and a fence structure, wherein the wheel body is partially exposed outside the casing, the rotation shaft is disposed within the wheel body, and the fence structure is arranged between the wheel body and the rotation shaft; and
      a wheel swinging seat disposed within the casing, wherein the wheel swinging seat is swingable relative to the casing and the wheel element is accommodated within the wheel swinging seat, wherein the wheel element is rotatably penetrated through the wheel swinging seat so that the wheel element is fixed on the wheel swinging seat;
      a fixing post installed on the wheel swinging seat, wherein the fixing post is penetrated through the swingable assembly so that the swingable assembly is fixed on the wheel swinging seat;
      an elastic element sheathed around the fixing post and contacted with the swingable assembly, wherein when the swingable assembly is not pushed by the adjusting element, the swingable assembly is contacted with the fence structure in response to an elastic force of the elastic element; and
      a signal generation module located beside the wheel swinging seat and detecting a rotation of the wheel element, wherein the signal generation module issues a corresponding rotation signal according to the rotation of the wheel element;
   a swingable assembly fixed on the wheel module and located near the wheel element, wherein the swingable assembly is swung relative to the wheel module in a direction toward the wheel element to be contacted with the fence structure, or the swingable assembly is swung relative to the wheel module in a direction away from the wheel element to be separated from the fence structure; and
   an adjusting element partially exposed outside the casing, wherein when the adjusting element is moved relative to the casing, the swingable assembly is correspondingly swung, wherein when the adjusting element is moved to a first position, the swingable assembly is not pushed by the adjusting element and the swingable assembly is contacted with the fence structure so that the wheel module is in a first clicking mode, wherein when the adjusting element is moved to a second position, the swingable assembly is pushed by the adjusting element and the swingable assembly is swung away from the wheel element and separated from the fence structure so that the wheel module is in a second clicking mode.

2. The roller mouse according to claim 1, wherein the wheel swinging seat comprises:

a seat body;

plural first holes formed in the seat body, wherein the rotation shaft is penetrated through plural first holes so that the wheel element is fixed in the seat body; and plural second holes formed in plural lateral surfaces of the seat body, wherein the plural second holes are aligned with the signal generation module and the signal generation module detects the rotation of the wheel element through the plural second holes.

3. The roller mouse according to claim 1, wherein the signal generation module comprises:

a light emitter located beside a first side of the wheel swinging seat and emitting a light beam; and a light receiver located beside a second side of the wheel swinging seat, wherein when the light beam from the light emitter is transmitted through the fence structure and received by the light receiver, the light receiver generates the corresponding rotation signal.

4. The roller mouse according to claim 1, wherein the signal generation module comprises:

a magnetic element installed on the rotation shaft and synchronously rotated with the rotation shaft;

a circuit board installed on a lateral surface of the wheel swinging seat; and a Hall sensor installed on the circuit board and located near the magnetic element, wherein the Hall sensor detects a magnetic field change of the magnetic element and generates the corresponding rotation signal according to the magnetic field change.

5. The roller mouse according to claim 1, wherein the swingable assembly comprises:

a main body having a fixing hole, wherein the fixing post of the wheel module is penetrated through the fixing hole so that the main body is fixed on the fixing post;

a first contact part located at a first end of the main body and located near the wheel element, wherein when the swingable assembly is close to the wheel element, the first contact part is contacted with the fence structure; and a second contact part located at a second end of the main body and contacted with the adjusting element, wherein when the second contact part is pushed by the adjusting element, the swingable assembly is swung relative to the wheel swinging seat.

6. A roller mouse, comprising:

a casing;

a wheel module disposed within the casing comprising:

a rotatable wheel element comprising a wheel body, a rotation shaft, and a fence structure, wherein the wheel body is partially exposed outside the casing, the rotation shaft is disposed within the wheel body, and the fence structure is arranged between the wheel body and the rotation shaft;

a wheel swinging seat disposed within the casing, wherein the wheel swinging seat is swingable relative to the casing and the wheel element is accommodated within the wheel swinging seat, wherein the wheel element is rotatably penetrated through the wheel swinging seat so that the wheel element is fixed on the wheel swinging seat;

a fixing post installed on the wheel swinging seat, wherein the fixing post is penetrated through the swingable assembly so that the swingable assembly is fixed on the wheel swinging seat;

an elastic element sheathed around the fixing post and contacted with the swingable assembly, wherein when the swingable assembly is not pushed by the switching module, the swingable assembly is contacted with the fence structure in response to an elastic force of the elastic element; and a signal generation module located beside the wheel swinging seat, and detecting a rotation of the wheel element, wherein the signal generation module issues a corresponding rotation signal according to the rotation of the wheel element;

a swingable assembly fixed on the wheel module and located near the wheel element, wherein the swingable assembly is swung relative to the wheel module in a direction toward the wheel element to be contacted with the fence structure, or the swingable assembly is swung relative to the wheel module in a direction away from the wheel element to be separated from the fence structure; and a switching module disposed within the casing and contacted with the swingable assembly, wherein when the switching module is driven, the swingable assembly is correspondingly swung, wherein when the switching module is not driven, the swingable assembly is contacted with the fence structure so that the wheel module is in a first clicking mode, wherein when the switching module is driven, the swingable assembly is swung in a direction away from the wheel element and separated from the fence structure so that the wheel module is in a second clicking mode.

7. The roller mouse according to claim 6, wherein the wheel swinging seat comprises:

a seat body;

plural first holes formed in the seat body, wherein the rotation shaft is penetrated through plural first holes so that the wheel element is fixed in the seat body; and plural second holes formed in plural lateral surfaces of the seat body, wherein the plural second holes are aligned with the signal generation module and the signal generation module detects the rotation of the wheel element through the plural second holes.

8. The roller mouse according to claim 6, wherein the signal generation module comprises:

a light emitter located beside a first side of the wheel swinging seat and emitting a light beam; and a light receiver located beside a second side of the wheel swinging seat, wherein when the light beam from the light emitter is transmitted through the fence structure and received by the light receiver, the light receiver generates the corresponding rotation signal.

9. The roller mouse according to claim 6, wherein the signal generation module comprises:

a magnetic element installed on the rotation shaft and synchronously rotated with the rotation shaft;

a circuit board installed on a lateral surface of the wheel swinging seat; and a Hall sensor installed on the circuit board and located near the magnetic element, wherein the Hall sensor detects a magnetic field change of the magnetic element and generates the corresponding rotation signal according to the magnetic field change.

10. The roller mouse according to claim 6, wherein the swingable assembly comprises:

a main body having a fixing hole, wherein the fixing post of the wheel module is penetrated through the fixing hole so that the main body is fixed on the fixing post;

a first contact part located at a first end of the main body and located near the wheel element, wherein when the swingable assembly is close to the wheel element, the first contact part is contacted with the fence structure; and a second contact part located at a second end of the main body and contacted with the switching module, wherein when the second contact part is pushed by the switching module, the swingable assembly is swung relative to the wheel swinging seat.

11. The roller mouse according to claim 6, wherein the switching module comprises:

a power element disposed within the casing, wherein when the power element is driven, the power element provides a rotation force; and a cam structure connected with the power element and contacted with the swingable assembly, wherein when the cam structure is rotated to a first angle, the swingable assembly is not pushed by the cam structure and the swingable assembly is contacted with the fence structure so that the wheel module is in the first clicking mode, wherein when the cam structure is rotated to a second angle, the swingable assembly is pushed by the cam structure and the swingable assembly is separated from the fence structure so that the wheel module is in the second clicking mode.

* * * * *